(12) United States Patent
Johnston et al.

(10) Patent No.: US 10,176,269 B1
(45) Date of Patent: Jan. 8, 2019

(54) CROSS-REFERENCES IN SERVICE SCHEMA

(71) Applicant: Amazon Technologies, Inc., Reno, NV (US)

(72) Inventors: Simon Kurt Johnston, Kirkland, WA (US); Michael David Rutter, Seattle, WA (US); Samuel Ytzhak Donnelley, Auburn, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 754 days.

(21) Appl. No.: 14/133,349

(22) Filed: Dec. 18, 2013

(51) Int. Cl.
*G06F 17/30* (2006.01)

(52) U.S. Cl.
CPC .. *G06F 17/30876* (2013.01); *G06F 17/30545* (2013.01)

(58) Field of Classification Search
USPC .......................................................... 707/770
See application file for complete search history.

(56) References Cited

U.S. PATENT DOCUMENTS

| | | | | |
|---|---|---|---|---|
| 6,202,023 B1* | 3/2001 | Hancock | ................ | G01C 21/20 701/516 |
| 2007/0226351 A1* | 9/2007 | Fischer | ............... | H04W 76/023 709/227 |
| 2009/0171991 A1* | 7/2009 | Gitai | ................. | G06F 17/30292 |
| 2012/0331001 A1* | 12/2012 | Foster | ................... | G06F 9/5055 707/770 |
| 2013/0318129 A1* | 11/2013 | Vingralek | ......... | G06F 17/30595 707/803 |

* cited by examiner

*Primary Examiner* — Muluemebet Gurmu
(74) *Attorney, Agent, or Firm* — Knobbe, Martens, Olson & Bear, LLP

(57) ABSTRACT

A system can include a schema for cross referencing independent yet related services. The schema can utilize reference properties and resource properties to partition data is separate services and allow for services to be added or removed without affecting the integrity of existing services. Embodiments described herein also avoid the need for complex transaction logic to maintain consistency between services. In some embodiments, the services can also utilize different database management systems.

19 Claims, 6 Drawing Sheets

(1) DATA REQUEST TO PRIMARY SERVICE
(2) PROCESS DATA REQUEST
(3) RESPONSE TO DATA REQUEST FROM PRIMARY SERVICE
(4) PROCESS RESPONSE FROM PRIMARY SERVICE
(5) DATA REQUEST TO TARGET SERVICE
(6) PROCESS DATA REQUEST
(7) RESPONSE TO DATA REQUEST FROM TARGET SERVICE
(8) PROCESS RESPONSE FROM TARGET SERVICE (1) DATA REQUEST TO PRIMARY SERVICE
(2) PROCESS DATA REQUEST
(3) DATA REQUEST TO TARGET SERVICE
(4) PROCESS DATA REQUEST
(5) RESPONSE TO DATA REQUEST FROM TARGET SERVICE
(6) PROCESS DATA REQUEST
(7) RESPONSE TO DATA REQUEST FROM PRIMARY SERVICE
(8) PROCESS RESPONSE FROM PRIMARY SERVICE

CROSS-REFERENCES IN SERVICE SCHEMA

BACKGROUND

Network-based services, such as Web services, can be utilized to communicate and implement functions in a network-based operating environment. Some network-based services are designed to interact with users, other applications, and databases to capture and analyze data. A network-based service can be configured to interface with various database management systems. The database management systems can be designed to allow the definition, creation, querying, update, and administration of databases. Database management system utilize standards such as structured query language (SQL), open database connectivity (ODBC), Java database connectivity (JDBC), and other standards.

It is a common situation to have network-based services from two entities that communicate with each other. An approach to modeling the communication between the two entities is to have a bi-directional relationship to maintain integrity between the two entities. If these entities are managed by a single service, then it is entirely possible and desirable that the response data explicitly be returned to the client with both forward and backward links.

BRIEF DESCRIPTION OF THE DRAWINGS

Throughout the drawings, reference numbers are re-used to indicate correspondence between referenced elements. The drawings are provided to illustrate embodiments described herein and not to limit the scope thereof.

DETAILED DESCRIPTION

I. Introduction

Figure 1:
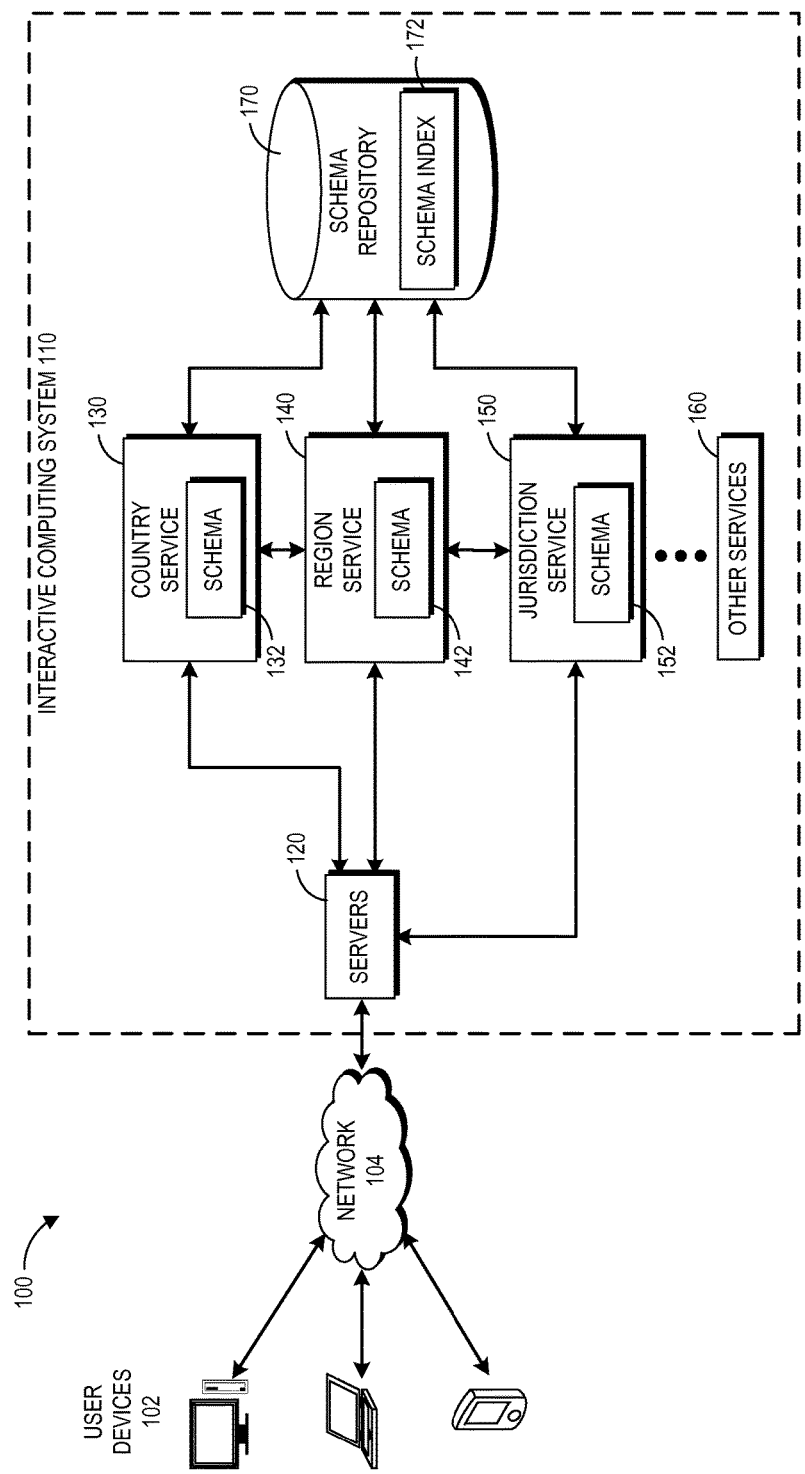
FIG. 1 depicts an embodiment of a networked computing environment that provides users with access to an interactive computing system capable of cross-referencing network-based services.

Embodiments of this disclosure describe an interactive computing system comprising a plurality of network-based services capable of cross referencing each other. Generally, relationships between data managed by different services are bi-directional to maintain integrity between the network-based services. Managing and coordinating updates to bi-directional relationships between separate services can be difficult. For example, updating the data can require updating a first service to relate to a second service, and then updating the second service to relate back to the first service. This can require two service calls and a complex notion of cross-service transactional behavior. Updates can also result in having to retry and undo logic to ensure consistency of the two services. As services expand in size it can be increasingly difficult to maintain integrity between related services.

In an illustrative embodiment, network-based services may publish a schema that includes resource properties that define resources contained within the service and reference properties that define resources available from other related services. In some embodiments, the service can include the schema. The reference properties can identify a method for accessing the resources from related services. The reference properties can also identify the data type associated with the resources. Relationships between services can be defined by reference properties within the schema of a first service (e.g., a "primary" service) directed to resources of a second service (e.g., a "target" service). In certain embodiments, the resources of the first service and the second service can be partitioned so that the resources of the first service are not dependent upon the resources in the second service (or vice versa).

In an illustrative example, a relationship is established between two network-based storage services. In the illustrative example, the services are a country service and a region service. The country service can provide resources related to one or more countries. The region service can provide resources relating to one or more defined regions. Each resource of the country service can be associated with one or more regions. However, each country can exist independent of the defined regions. Accordingly, a region is not necessarily a defining property of a country, whereas a region may be defined by the countries that it encompasses. In this manner, a country service may be a primary service that references the region service. A reference property can be added to a country service schema that allows the country service to access the region service to determine regions associated with a country. However, the resource data associated with the country can be partitioned from the region data so that there is not a bi-directional relationship between the country data and the region data. For example, a region may be composed of a list of countries that can be modified by adding or removing countries from the record set contained within the region service. Modifying the region may be performed by a single service call to the region service. The country service does not have to be updated because the region resources are not stored with the country resources in an embodiment. In this manner, the country service may not maintain the list of regions at all, but rather, the country service may access the list of regions via a query or other service call to the region service.

Embodiments described herein allow data to be partitioned and allow for services to be added or removed without affecting the integrity of existing services. Embodiments described herein also avoid the need for complex transaction logic to maintain consistency between services. As used herein, the term "service," in addition to having its ordinary meaning, may be used interchangeably with "network-based service" to refer to a network-based computing system which can be utilized to implement functions for, on or behalf of, other computing devices in a network-based operating environment. For example, the services can include computing services (e.g., computing resources that can be used to implement computer applications), networking services (e.g., a domain name service), content delivery services (e.g., a content delivery network), storage services (e.g., a network-based file storage service), database services (e.g., a scalable non-relational database), and other network-based services. Further, not necessarily all advantages described herein are shared by every embodiment of this disclosure.

II. Interactive Computing System Overview

Turning to FIG. 1, an example networked computing environment 100 is shown in which access to an interactive computing system 110 is provided to user devices 102 over a network 104. The interactive computing system 110 can represent a hardware platform, or a software (as implemented by hardware) platform, for which clients can access various services. The user devices 102 can connect to the interactive computing system 110 via the network 104, and the interactive computing system 110 can provide the user devices 102 with access to various services within the platform of the interactive computing system 110.

By way of illustration, various example user devices 102 are shown, including a desktop computer, laptop, and a mobile phone. In general, the user devices 102 can be any computing device such as a desktop; laptop; mobile phone (or smartphone); tablet; kiosk; server; gaming console or controller; television; wristwatch (including a smartwatch) or other wearable computing device; electronic book reader; wireless device; set-top or other television box; media player; one or more processor devices; integrated circuit components for inclusion in computing devices, appliances, electronic devices for inclusion in vehicles or machinery; etc. The user devices 102 access the interactive computing system 110 over the network 104.

The user devices 102 can be representative of clients that can communicate with the services of the interactive computing system 110. The user devices 102 can execute various applications that are installed on the user devices 102, such as a browser, mobile applications, or the like. The applications can interact with one or more of the services associated with the interactive computing system 110. In some embodiments, the applications can render various user interfaces to facilitate presentation of data. In some embodiments, the interactive computing system 110 executes or triggers execution of one or more services in response to a request from one or more of the user devices 102. For example, the interactive computing system 110 can execute one or more functions and/or applications that can interface with one or more services. An application can interface directly with the services. In some embodiments, the interactive computing system 110 is representative of a client that can interact with the services. In other embodiments, the services can be accessed indirectly via a library that can interface with the services.

The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the communication network 104 may be a publicly accessible network of linked networks, possibly operated by various distinct parties, such as the Internet. In some embodiments, the communication network 104 may be a private or semi-private network, such as a corporate or university intranet. The communication network 104 may include one or more wireless networks, such as a Global System for Mobile Communications (GSM) network, a Code Division Multiple Access (CDMA) network, a Long Term Evolution (LTE) network, or any other type of wireless network. The communication network 104 can use protocols and components for communicating via the Internet or any of the other aforementioned types of communication networks.

Further, the interactive computing system 110 may be implemented in hardware and/or software and may, for instance, include one or more physical or virtual servers implemented in physical computer hardware. The one or more servers may be geographically disbursed or geographically co-located, for instance, in one or more data centers.

For purposes of illustration, the processes disclosed herein are described primarily in the context of an interactive computing system 110 that provides users with access to one or more services. The interactive computing system 110 can be implemented as a network application, which may be a network site (e.g., a web site), a mobile application, a combination of the same, or the like. In the depicted embodiment, the interactive computing system 110 includes servers 120 which can communicate with the user devices 102 over the network 104 and which can provide access to various services of the interactive computing system 110. In the depicted embodiment, the services of the interactive computing system 110 include a plurality of storage services, including, a country service 130, a region service 140, and a jurisdiction service 150. The interactive computing system 110 can include any number of other services 160, such as computing services, networking service, content delivery services, database services, storage services and so forth, which are not illustrated in this embodiment. The services 130, 140, 150, and 160 can be implemented in physical computer hardware on the servers 120 or in separate computing devices. Moreover, the processing of the various components or services of the interactive computing system 110 can be distributed across multiple machines, networks, or other computing resources. The various components or services of the interactive computing system 110 can also be implemented in one or more virtual machines or hosted computing environment (e.g., cloud resources), rather than in dedicated servers. Likewise, the data repositories shown can represent local and/or remote, physical and/or logical data storage, including, for example, storage area networks or other distributed storage systems. In some embodiments, the connections between the components or services shown represent possible paths of data flow, rather than actual connections between hardware. Executable code modules that implement various functionalities of the interactive computing system 110 can be stored in the memories of the servers 120 and/or on other types of non-transitory computer-readable storage media. While some examples of possible connections are shown, any subset of the components shown can communicate with any other subset of components in various implementations.

The country service 130 of the interactive computing system 110 can provide information related to one or more countries. For example, the country service 130 can include detailed information about each country (e.g., name, country code, population, official language, etc.). The country service 130 may have an associated schema 132. The schema can be an organizational structure that provides an external view of data retrievable from the service. The schema can define the structure of a data store of the service and define how to access objects stored within the data store of the service. The schema can also define how to access objects associated with the service that are stored within a data store of another service. The schema can correspond to any type of electronic data store and use any file format. In some embodiments, the schema can correspond to a specific database management system, such as a relational, a non-relational, or other database management system. The schema can include a set of formulas that impose constraints on the specific data store.

The region service 140 of the interactive computing system 110 can provide access to information related to one or more geographic regions. The region service 140 can include detailed information related to one or more predefined geographic regions, such as a continent (e.g., North America) or grouping of countries (e.g., the European Union). The region information can identify region(s) associated with countries identified within the country service 130. The region service 140 may have an associated schema 142.

The jurisdiction service 150 of the interactive computing system 110 can provide tax jurisdiction information. The tax jurisdiction information can be related to countries, states, cities, or other defined tax jurisdiction. For example, the jurisdiction service 150 can provide tax jurisdiction information for countries identified within the country service 130 and regions in the region service 140. The jurisdiction service 150 may have an associated schema 152.

The schema repository 170 of the interactive computing system 110 may include a schema index 172. The schema index 172 can provide an index for the schemas associated with each service. The index can include a unique identifier associated with each schema. The identifier can be used to reference related services. In some embodiments, the relationships between the services are stored within the individual schemas. In other embodiments, the schema repository 170 can store relationships between different services.

The interactive computing system 110 can be structured to include other services 160 that are not shown or described. The country service 130, region service 140, and jurisdiction service 150 are provided as non-limiting examples of services that can help illustrate the functionality of the interactive computing system 110. In other embodiments, the interactive computing system 110 can include any number of services that are not limited to the services disclosed herein.

Figure 2:
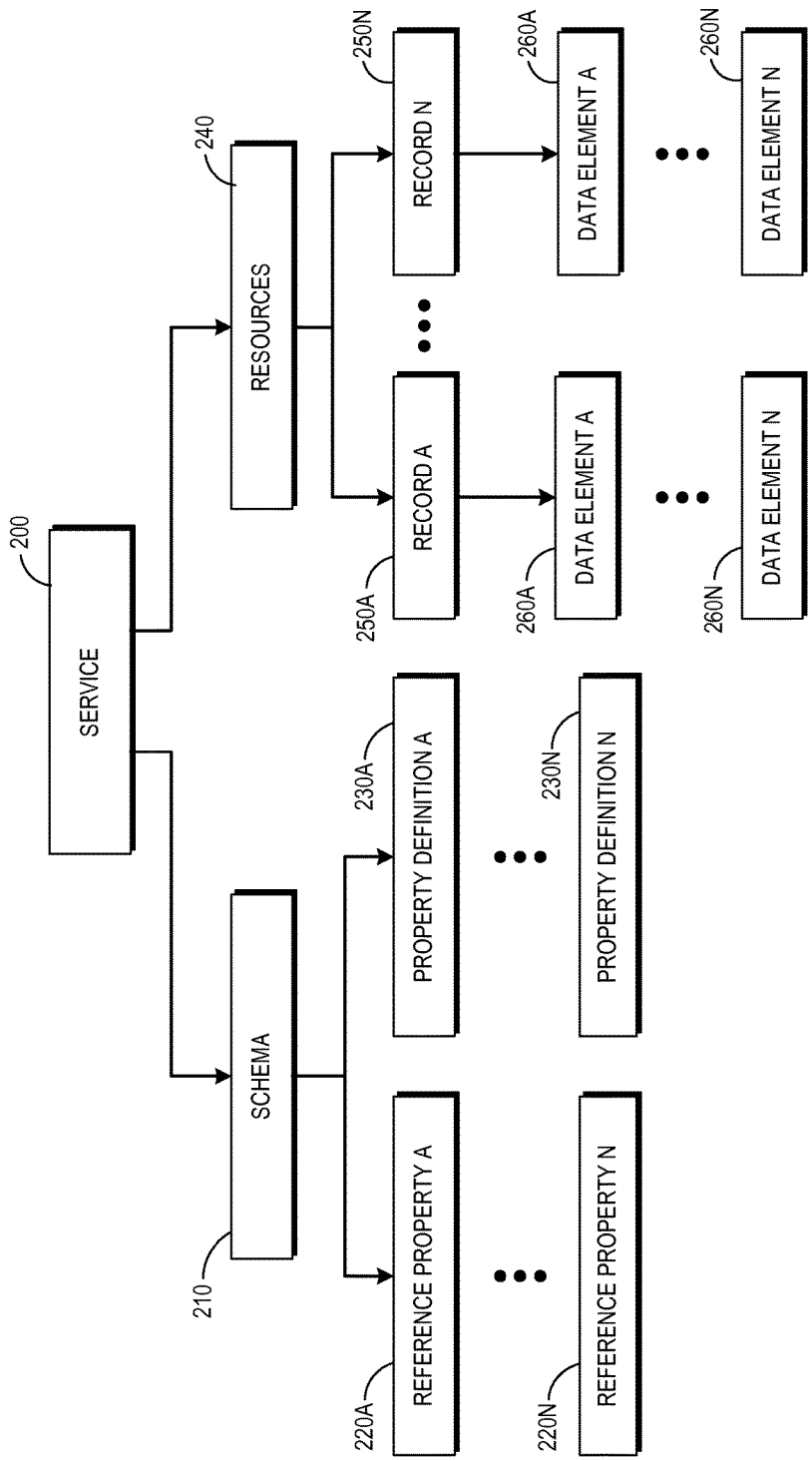
FIG. 2 depicts a block diagram of an embodiment of data components associated with a network-based service.

FIG. 2 is a block diagram illustrating data components associated with an exemplary service 200. The data components illustrate a general organizational structure for a service 200 that may be executed by the interactive computing system 110, such as the country service 130, the region service 140, the jurisdiction service 150 or other possible services. Data components can be added or removed as needed dependent upon the specific specifications and requirements of an individual service. In the illustrated example, the service 200 includes a schema 210 and resources 240. The resources 240 include a plurality of data records 250A-N, which each contain a plurality of data elements 260A-N. The data records 250 can be stored within a non-transitory computer readable medium. The schema 210 may have a plurality of reference properties 220 and a plurality of resource properties 230. The schema 210 can have any number of reference properties 220 and resource properties 230 defined within the schema 210. The schema 210 can provide an external view of data that can be accessed from the service 200 via resource properties 220 and data that can be accessed from another service via the resource properties 230. Resource properties 230 and reference properties 220 will be explained in more detail below. The schema 210 and resources 240 can be implemented in a data store associated with the schema 210. In some embodiments, the schema 210 is associated with a database management system, such as a relational, a non-relational, or other database management system.

The resources 240 can include a plurality of data records 250A-N. The service 200 can contain any number of data records 250. Each record 250 can include a plurality of data elements 260A-N (or one or more data elements in other embodiments). The data elements 250 can be any data type, such as integers, strings, lists, arrays, Boolean values, or any other data type. The type of data stored within each data element can be defined within the schema 210 by a corresponding resource definition 230. The schema 210 can have a resource definition 230 for each data element 260. In certain embodiments, the resources do not include data elements corresponding to reference properties 220 defined within the schema 210. In this manner, the service can partition the data and delegate functions to other services.

The resource definitions 230 may define the information stored within each record 250. The resource definitions 230 define each data element 260 included in the record 250, such as, data type (e.g., integers, strings, lists, arrays, Boolean values, or any other data type), labels, and any information associated with each data element 260. For example, in one embodiment, a schema 142 for the region service 140 may define records for each region. Each region record may contain an identifier for the region, a name of the region, and a list of countries in the region. In this instance, the resource definition associated with the identifier can define a label associated with the identifier and a data type for the identifier, such as a string. The resource definition 230 can define similar information for each data element 260 within the data record 250. For example, a region data record for the region of North America can contain the identifier ("NA"), the name ("North America"), and a list of countries within the region ("MX," "US," "CA"). In other embodiments, the region service schema 142 can have different resource definitions 230 for the resource records 250.

The schema 210 also includes a plurality of reference properties 220. The reference properties 220 can allow for data in the service 200, also referred to as a primary service, to be related to data in another service, also referred to as a target service. The reference property 220 can identify the mechanism by which the data stored in the target service can be retrieved. The reference property 220 can also identify the data type of the value stored in the target service. A plurality of reference properties 220 can be directed to the same target service with each reference property 220 relating to a different value in the target service. Additionally, the reference properties 220 can be directed to a plurality of different target services.

In some embodiments, the reference properties 220 can be directed to a target service that utilizes a different database management system than the primary service. The reference property 220 can identify the mechanism that can be used to query and/or retrieve the target data even if it utilizes a different database management system. For example, the primary service can utilize a relational database management system to store data records, and the target service can utilize a non-relational database management system.

In some embodiments, the primary service 200 does not store data records associated with the reference properties 220. The target data records referenced by the reference properties 220 can be stored instead in the data records of the target service. In some embodiments, the resource properties of the primary service do not reference the data values associated with the target service data records, which can partition the primary service data records from the target service data records. This relationship may allow the primary service data records and the target service data records to be updated independently without requiring a client application to manage bi-directional transactions between related services.

In some embodiments, the reference property 220 can be explicitly defined and can provide access details that can be used to identify a query to execute on the target service in order to return the target data. For example, the reference property can define a reference property name, a label describing the reference property, and a reference uniform resource identifier (URI) or uniform resource locator (URL) for accessing the referenced data. In some embodiments, the access method can use queries using a hypertext transfer protocol (HTTP) URI. In some instances, URI queries can be used to determine what data to retrieve and return. In some embodiments, the reference property 220 does not explicitly identify the service or the value type of the target data. Rather, the service and the value type can be contained and referenced within the URI query. The URI or URL query may be a web service call, remote procedure call, or the like.

In some embodiments, the reference property 220 can introduce a specific dependency on the target service, and the reference property can explicitly define the service, the query, and/or the value type of the referenced data. For example, the reference property 220 can define a reference property name, a target service, a query to the target service, and a value type associated with the target value. The query can specifically identify the property and how the data will be returned to the primary service.

In the example discussed above, the country service 130 and the region service 140 are related. One embodiment of the schema 142 for the data managed by the region service 142 can include properties, such as an identifier, a name, and a list of countries contained within each region. A client can update the region resource record by adding and removing countries from the region. The related resource in the country service 130 does not have to be updated with the region service because the country service 130 does not have a data record with a corresponding data element for a region in this embodiment. Rather, the country service 130 has a reference property within the schema 132 that corresponds to the target data within the region service. The data records in the country service 130 do not have a bi-directional dependency with the record data in the region service 140. The data records of the country service 130 and the data records of the region service 140 can be updated independently without requiring an update of a related service.

By partitioning the data records of the related services, the data record of each service can be updated individually without checking for bi-directional compatibility between all related services each time an additional service is added. New services can be integrated and related to existing services by updating the reference properties 220 within the schema of each related service. For example, if a new service utilizing a new database management system is added to the interactive computing system 110, a reference property 220 can be added to an existing service that can retrieve the target data from the new target service without modifying the existing data records in the existing service. The reference property can describe the mechanism to query and/or retrieve the target value associated with the new target service value and, in some embodiments, the data type of the target value. The primary service can then retrieve the target data associated with the new service.

With reference back to FIG. 1, the country service schema 132 may define one or more characteristics of the data within the country service 130. For example, in one embodiment, the country service can provide data associated with a plurality of countries, such as country name, country code, population, official language and other information associated with the country. In one example, the country service 130 includes records for Canada, the United States of America, and Mexico.

The country service 130 can be related to the region service 140, the jurisdiction service 150, or one of the other services 160 by adding a reference property to the schema of the country service 130. The reference property can create a relationship with another service that allows the country service 130 access to independent yet related data records of another service. In certain embodiments, the reference properties in the primary service relate to target data elements within the target service that are not contained within the primary service. For example, the country service schema 132 can reference data elements in the region service 140. The reference property in the country service schema 132 can identify the mechanism used to dereference the target data element within the region service 140. The target data can be accessed by the primary service using the reference property regardless of the data type or different database management systems utilized by the related services. The target data can be contained in one or more target services.

In an illustrative example, the country service 130 contains records for Mexico, the United States, and Canada. The region service 140 contains a record for the region of North America that identifies Mexico, the United States, and Canada as associated countries. The data records of the country service 130 do not identify regions associated with each country and there is no indication within the data records of the country service 130 that countries are associated with a region defined by the region service 140. The reference property within the country service schema 132 can identify the region data associated with the countries and how the country service 130 can access the target region data. For example, the country service 130 can execute a query on the region service 140 to identify some or all regions associated with Mexico based on the information contained within the reference property. The country service schema 132 can also include reference properties related to the jurisdiction service 150, which can allow the country service 130 to dereference data in the data records of the jurisdiction service 150. The reference property can identify specific tax jurisdiction data contained within the jurisdiction service 150.

In an illustrative example, a client can query the country service 130 to request data related to a country, such as the population, the region, and the tax jurisdiction. In response to the query, the client will then receive the population data of the country service 130 from the country service resource record, the region information from the region service 140 and the tax jurisdiction data from the jurisdiction service 150. The country service schema 132 identifies the population data element within a resource definition and the region and tax jurisdiction as reference properties. In response to the population query, the client retrieves the data from the records within the country service 130. In response to the region and tax jurisdiction queries, depending on the configuration, the client or the country service can dereference the requested data, which will be discussed in more detail in relation to FIGS. 3 and 4.

For the region query, the data can be accessed in accordance with the information contained within the country service schema 132. In certain embodiments, the region query can dereference the region service 140 and the region service 140 can return a response based on the specific parameters of the query that can be defined within the reference property of the country service schema 132. For example, the region query can identify North America. Depending on how the query is defined there can be more regions with which the United States can be associated with depending on what information is actually contained within the region service 140. For example, the region service 140 can include the United States in the region of North America and as a member of the North American Free Trade Agreement. For the tax jurisdiction query, the jurisdiction service 150 can return tax jurisdiction data for the United States in accordance with the information provided in the reference property within the country service schema 132. The query can be made to the jurisdiction service 150 and the response can be obtained from the jurisdiction service 150 by dereferencing the record data in the jurisdiction service based on the reference property contained in the country service.

The data records in each service can be partitioned and can be updated without interfering with compatibility or interoperability between services. For example, the region service 130 can be updated to include a region that includes each country with English as the official language. The same query as described above to the region service 140 can return the new region without any change to the region service schema 132. To the extent that additional services are added to the interactive computing system, the services can be related to one or more services by incorporating reference properties into the schema of the service. Any number of relationships can be created between the services through the usage of the reference properties.

Figure 3:
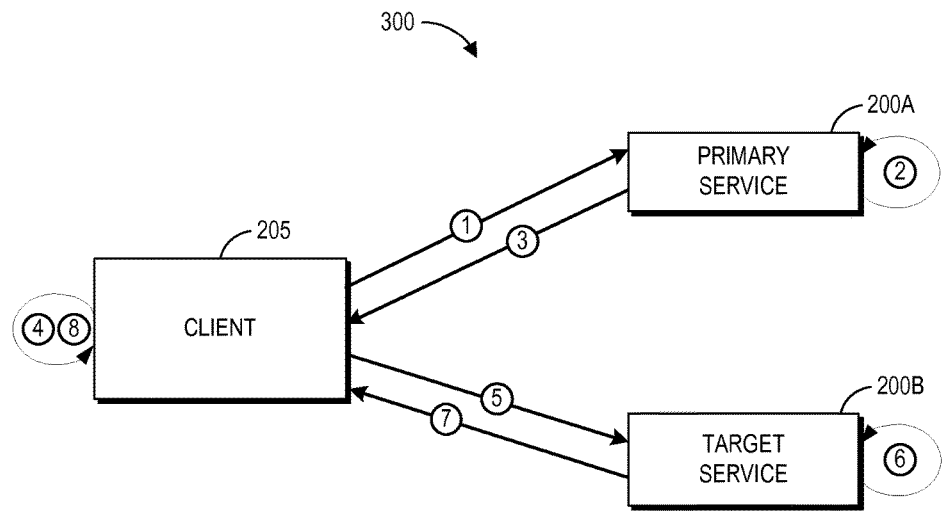
FIG. 3 depicts an embodiment of a state flow diagram in which an aggregate execution profile of a script is provided to a client device.

Turning now to FIG. 3, an example state flow diagram 300 is depicted in which the client is dereferencing the target service. In the illustrated example, the client 205 queries the primary service and the target service separately. The client 205 can query the services directly using an application or indirectly utilizing a library or code module that encapsulates the behavior. In certain embodiments, the types associated with the reference properties and the resource properties are transparent to the client 205. In other words, the client 205 knows which data records are stored in each service. In the illustrated example, the client 205 can be associated with a user device 102 and/or the interactive computing system 110.

At state 1, the client 205 requests data from the primary service 200A. The request can be a request for data stored within the record data of the primary service 200A. The request relates to data elements associated with resource properties in the schema of the primary service 200A. The request to the primary service can be based on the resource properties of the requested data in the primary service 200A. At state 2, the primary service 200A processes the data request. The primary service 200A can retrieve the data from the data records in response to the request. At state 3, the primary service responds to the request from the client 205 with the requested data. At state 4, the client 205 processes the response from the primary service 200A. In some embodiments, the client 205 can process the response prior to initiating state 5 of the flow. For example, the client 205 can utilize a routine embodied in FIG. 6 to determine whether to proceed with the flow. In some embodiments, the client 205 proceeds to state 5 and sends a query to the target service regardless of the response received from the primary service 200A.

At state 5, the client 205 requests target data from the target service 200B. The request can relate at least in part to data elements associated with reference properties in the schema of the primary service 200A. The data request to the target service 200B can be based on the information provided by the reference property associated with the target data. The reference property can be stored within the schema of the primary service 200A. The client 205 can utilize the reference property information to dereference the target service 200B to receive the target data. At state 6, the target service 200B processes the request from the client 205. At state 7, the target service 200B responds to the request from the client 205 with the target data. At state 8, the client 205 processes the response from the target service 200B.

In an illustrative example, the country service 130 is the primary service 200A and the region service is the target service 200B. Accordingly, the client 205 can query the country service 130 for the full name of the country based on the resource contained in schema 132 and can separately query the region service 140 for the regions associated with the country based on the reference property contained in schema 132.

Figure 4:
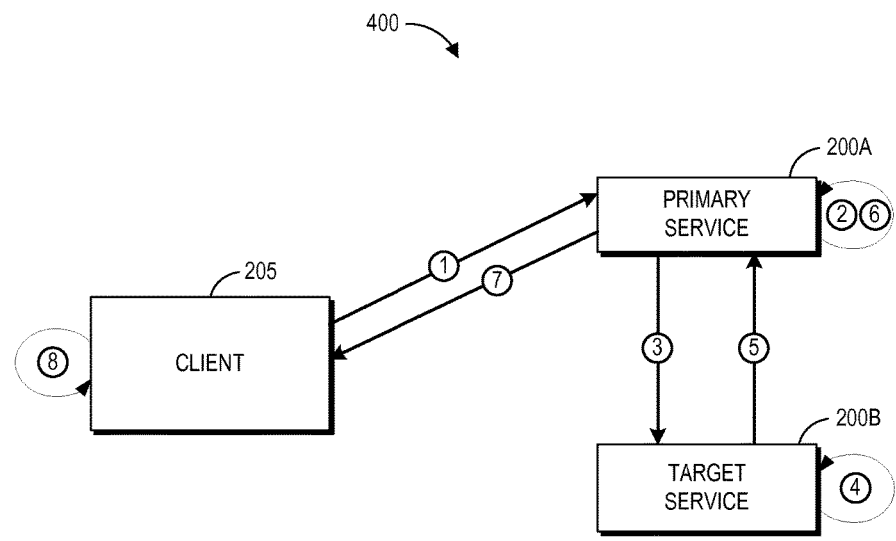
FIG. 4 depicts an embodiment of a state flow diagram in which a decompiled script is provided to a client device.

Turning to FIG. 4, an example state flow diagram 400 is depicted in which a primary service 200A dereferences a target service 200B. In the illustrated example, the primary service 200A dereferences the target service 200B for a query and incorporates the data from the target service 200B within its response to the client 205. In this embodiment, the difference between resource properties and reference properties can be opaque to the client 205. For instance, the client 205 may view some or all properties associated with the primary service 200A as originating from the primary service 200A without reference to the target service 200B. In some embodiments, the primary service 200A can be responsible for handling of error conditions associated with the target service 200B.

At state 1, the client 205 requests data from the primary service 200A. The request includes requests for data relating to resource properties and reference properties in the schema of the primary service 200A. At state 2, the primary service 200A processes the request from the client 205. The primary service 200A can process the request based on the resource properties and the reference properties of the requested data. The primary service 200A can determine the data that is to be requested from the target service 200B.

At state 3, the primary service 200A requests the target data from the target service 200B. At state 4, the target service 200B processes the data request from the primary service 200A. At state 5, the target service 200B responds to the request from the primary service 200A with the target data. At state 6, the primary service 200A processes the response from target service 200B and incorporates the target data from the target service 200B with the data for the primary service 200A. At state 7, the primary service 200A returns the combined data to the client 205. At state 8, the client 205 processes the response. This example differs from the example in FIG. 3 in that the primary service 200A dereferences the target service 200B rather than the client 205 dereferencing the target service 200B.

Figure 5:
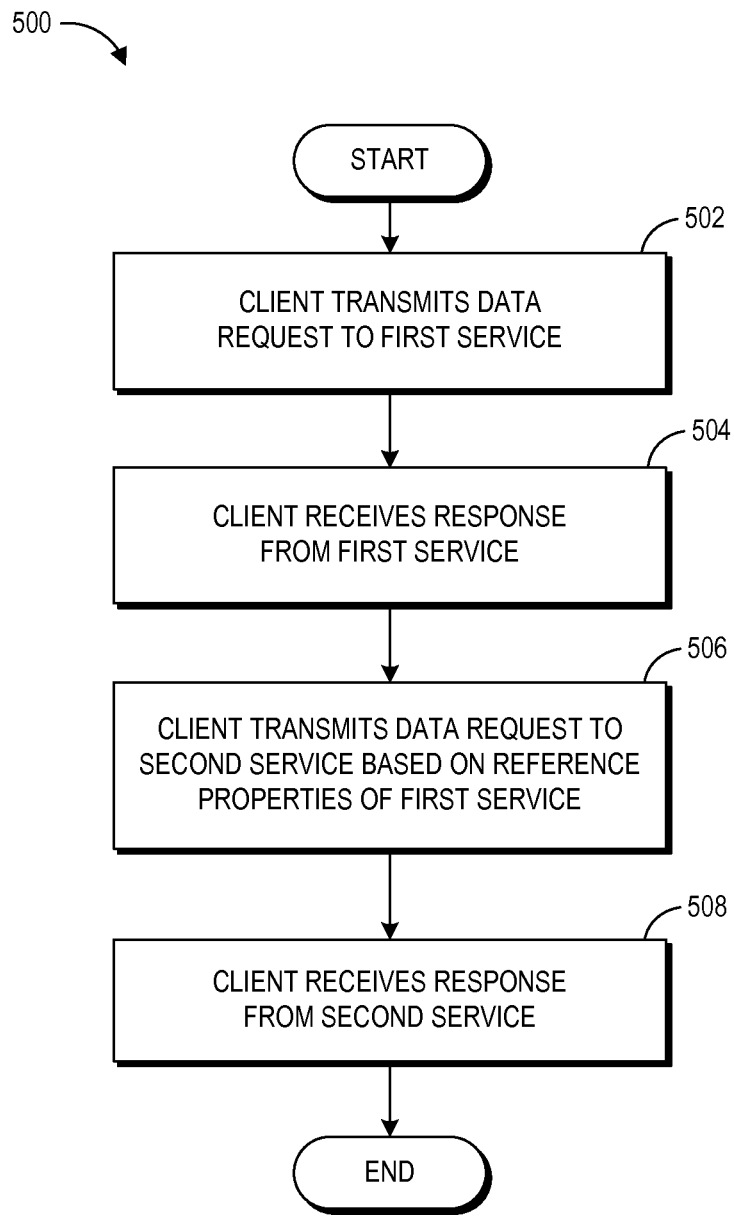
FIG. 5 depicts an embodiment of a process for dereferencing a related network-based service.
Figure 6:
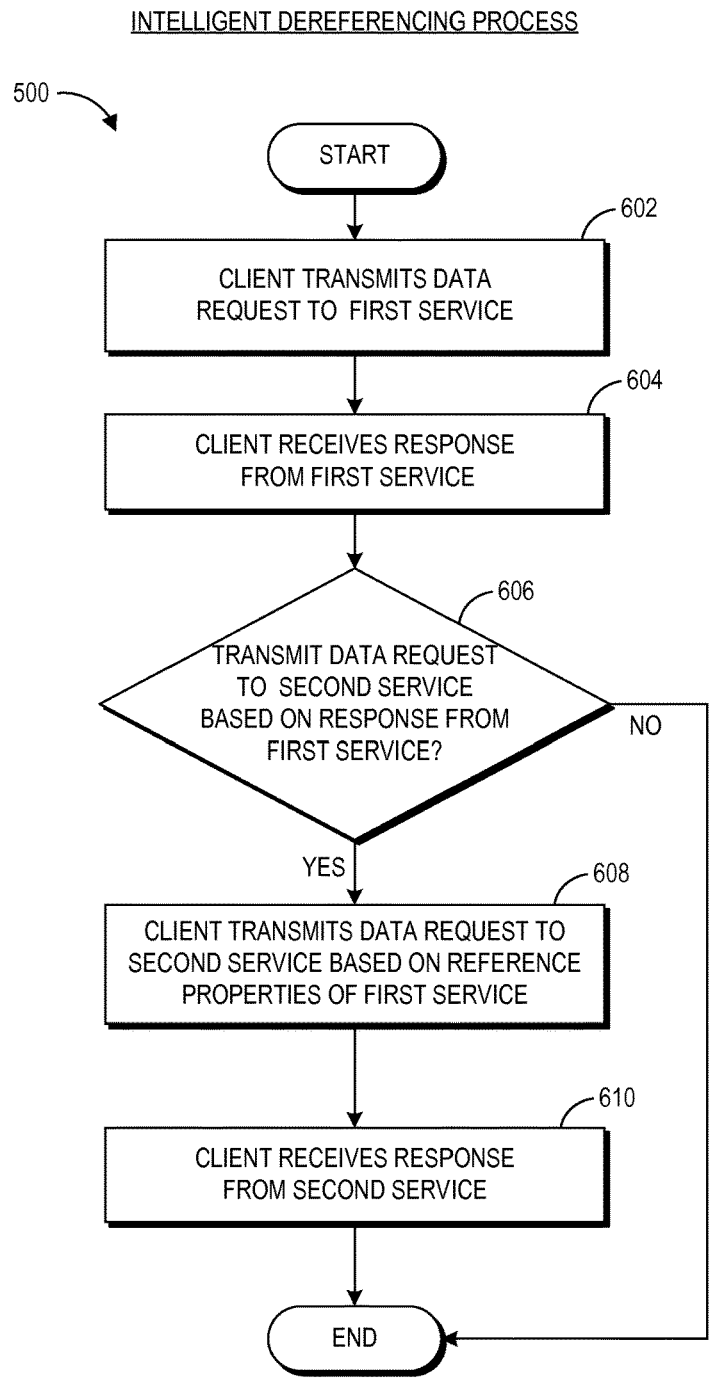
FIG. 6 depicts an embodiment of a process for intelligently dereferencing a related network-based service.

Turning to FIGS. 5 and 6, example processes 500, 600 are shown that may be implemented by the interactive computing system 110. In particular, FIG. 5 depicts a process for dereferencing a service 500, and FIG. 6 depicts a process for intelligently dereferencing a service 600. For convenience, the processes 500, 600 will be described in the context of the devices and systems shown in FIGS. 1-4. However, it should be understood that the processes 500, 600 can be implemented by any computing device and not just the computing devices shown in FIGS. 1-4.

With specific reference to FIG. 5, an example process for dereferencing a service is illustrated. At block 502, a client transmits a data request to a primary service for data associated with resource properties defined within a schema of the primary service. At block 504, the client receives a response from the primary service that includes data associated with resource properties of the primary service schema.

At block 506, the client requests data associated with reference properties defined within the schema of the primary service from the target service. The request to the target service can be based on information within the reference properties that identifies and/or defines a method for accessing the values within the target service. The reference property can also provide additional information regarding the requested data such as a data type. At block 508, the client receives a response from the target service that includes data associated with reference properties of the primary service schema. The client can continue to request data from any number of target services.

With specific reference to FIG. 6, an example process for intelligently dereferencing a service 600 is illustrated. At block 602 of the process 600, a client transmits a data request to a primary service for data associated with resource properties defined within a schema of the primary service. At block 604, the client receives a response from the primary service that includes data associated with resource properties of the primary service schema.

At block 606, the client determines whether to send a request to the target service based on the data received in the response from the primary service. If the client determines, based on the response, to call the second service, then the process proceeds to block 608. If the client determines not to call the target service based on the response from the primary service, the process terminates. In an illustrative example, the primary service can provide the quantity or inventory of a particular item within a warehouse. The target service can be a reordering service or a restocking service. The client can call the primary service to determine what the current quantity of the requested item in the warehouse. If the quantity of the item is less than a specified threshold, then the client may want to call the restocking service to reorder additional items. If the quantity is greater than the threshold, then the client may not order additional items.

At block 608, the client requests data associated with reference properties defined within the schema of the primary service from the target service. The request to the target service can be based on information within the reference properties that identifies and/or defines a method for accessing the values within the target service. The reference property can also provide additional information regarding the requested data such as a data type. At block 610, the client receives a response from the target service that includes data associated with reference properties of the primary service schema. The client can continue to request data from any number of target services.

III. Example Implementation

The examples below contain non-limiting examples of implementations of the functions described herein. Example 1 below illustrates an embodiment of resource properties included within a schema for a region service 140 as described above.

Example 1: Region Resource Schema
{
  label: "Business Region",
  properties: {
    id: {
      label: "Identifier for the region",
      type: "Integer"
    },
    name: {
      label: "Name of this region",
      type: "String"
    },
    countries: {
      label: "List of countries in this region",
      type: "[String:2]"
    }
  }
}

Example 2 below illustrates an embodiment of a record included within a region service 140 based on the schema of the resource properties in Example 2.

Example 2: Region Resource Description
{
  id: "NA",
  name: "North America",
  countries: ["MX", "US", "CA"]
}

Example 3 illustrates an embodiment of a record included within a country service 130.

Example 3: Country Resource Description
{
  countryCode: "US",
  name: "United States of America"
}

Example 4 illustrates an embodiment of resource properties and reference properties included within a schema for a country service 130. In this embodiment, the reference properties include a uniform resource locator (URL) query for determining data to retrieve and return, where http://.../region?query={id}+in+countries&return=countryCode represents the URL query string of the URL query.

Example 4: Country Resource Schema
{
  label: "Country",
  properties: {
    countryCode: {
      label: "ISO 2-letter country code",
      type: "String:2",
      readOnly: true
    },
    name: {label: "Name of the country", type: "String"},
    regions: {
      label: "List of regions this country belongs to",
      type: "reference",
      referenceUrl:
        "http://.../region?query={id}+in+
          countries&return=countryCode"
    }
  }
}

Example 5 illustrates another embodiment of resource properties and reference properties included within a schema for a country service 130. In this embodiment, the reference properties explicitly identify the service ("region"), the query ("countryCode in region:countries"), and the value type ("region:id[ ]").

Example 5: Country Resource Schema (alternative 2)
{
  label: "Country",
  properties: {
    countryCode: {
      label: "ISO 2-letter country code",
      type: "String[2]",
      readOnly: true
    },
    name: {label: "Name of the country", type: "String"},
    regions: {
      label: "List of regions this country belongs to",
      type: "reference",
      service: "region",

```
        query: "countryCode in region:countries",
        value: "region:id[ ]"
      }
    }
  }
}
```
Example 6 illustrates another embodiment of resource properties and reference properties included within a schema for a region service 140.

Example 6: Region Resource Schema
```
{
  label: "Business Region",
  properties: {
    id: {
      label: "Identifier for the region",
      type: "Integer"
    },
    name: {
      label: "Name of this region",
      type: "String"
    },
    countries: {
      import: ["country"],
      label: "List of countries in this region",
      type: "country: countryCode[ ]"
    }
  }
}
```
Example 7 illustrates an embodiment of a client dereferencing a primary service (country service 130) and a target service (region service 140).

Example 7: Client Based De-reference
```
public interface Country {
  String getCountryCode( );
  String getName( );
  void setName(final String name);
  Reference<List<String>>getRegions( );
}
```

IV. Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

The various illustrative logical blocks, modules, and algorithm states described in connection with the embodiments disclosed herein can be implemented as electronic hardware, computer software, or combinations of both. To clearly illustrate this interchangeability of hardware and software, various illustrative components, blocks, modules, and states have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system comprising:
a first data store configured to store a plurality of primary service data records and a reference property that references a target service data record maintained in a second data store, the reference property comprising an instruction for accessing the target service data record, wherein the instruction is a service call to the target service data record;
a primary service computing device comprising a hardware processor, the primary service computing device in communication with the first data store and configured to:
receive a first request from a client device to access a selected primary service record of the plurality of primary service data records, the selected primary service record comprising the reference property; and
transmit a second request to the target service computing device requesting the target service data record using the instruction in the reference property;
a target service computing device comprising a hardware processor, the target service computing device in communication with the second data store, the target service computing device configured to respond to the second request with the target service data record responsive to the instruction of the reference property; and
a schema repository configured to store a schema index, wherein the primary service computing device implements a first schema and the target service computing device implements a second schema, wherein the schema index has an identifier associated with each of the first schema and the second schema;
wherein the primary service computing device is configured to transmit a response to the first request to the client device comprising the target service data record, wherein the client device associates the selected primary service record with the primary service computing device, and wherein the transmission of the second data request and the response to the second data request are executed without the client device communicating with the target service computing device and without the client device receiving an indication that the primary service computing device communicates with the target service computing device.

2. The system of claim 1, wherein the primary service computing device is associated with a first database management system and the target service computing device service is associated with a second database management system.

3. The system of claim 2, wherein the first database management system and the second database management system are separate systems.

4. A system comprising:
a data store configured to store a primary service data; and
a schema repository configured to store a schema index, wherein a first computing device implements a first schema and a second computing device implements a second schema, wherein the schema index has an identifier associated with each of the first schema and the second schema;
the first computing device in communication with the data store, the computing device configured to:
receive, from the second computing device, a first data request comprising a request for target service data stored in a data store of a computing system implementing a target service;
process the first data request to identify a reference property in a primary service schema associated with the target service data, wherein the reference property is used to access the target service data stored in the data store of the computing system implementing the target service, wherein the reference property comprises a service call for accessing the target service data from the target service;
transmit, to the computing system implementing the target service, a second data request for the target service data, wherein the second data request is performed based at least in part on the service call included in the reference property;
receive, in response to the second data request, the target service data from the computing system implementing the target service, wherein the second computing device associates the target service data with the first computing device, wherein the communicating with transmission of the second data request and receipt of the response to the second data request are executed without the second computing device communicating with the target service and without the second computing device receiving an indication that the first computing device communicates with the target service; and
transmit a response to the first data request to the second computing device, the response comprising the target service data.

5. The system of claim 4, wherein the first data request further comprises a request for primary service data, and wherein the computing device is further configured to retrieve, based at least in part on the primary service schema, the requested primary service data stored within the data store.

6. The system of claim 4, wherein the primary service data comprises country data associated with a plurality of countries.

7. The system of claim 6, wherein the country data comprises at least one of a country name, a country code, a population, and a language spoken in the country.

8. The system of claim 7, wherein the target service data comprises region data regarding regions that comprise a plurality of countries.

9. The system of claim 8, wherein the reference property facilitates identification of a region associated with each of the plurality of countries.

10. The system of claim 4, wherein the service call comprises a hypertext transfer protocol uniform resource identifier.

11. The system of claim 4, wherein the reference property used to access the target service data comprises a reference property name, a target service identifier, and the service call is a query to the target service.

12. A non-transitory physical computer storage comprising computer-executable instructions stored thereon that, when executed in one or more processors, are configured to execute operations comprising:
   storing a schema index in a schema repository, wherein a first service implements a first schema and a second service implements a second schema, wherein the schema index has an identifier associated with each of the first schema and the second schema;
   receiving a first request, at a first service, for data associated with a resource property defined within a schema of the first service from a client computing device;
   determining whether the first data request comprises a request for second data associated with a reference property stored in a primary service schema, wherein the second data is stored within a data store of the second service that is separate from the first service, and wherein the reference property is used to access the second data stored in the data store of the second service, wherein the reference property comprises a service call for accessing the second data from the second service;
   transmitting, based at least in part on the service call of the reference property, a second request to the second service for the second data; and
   receiving, in response to the second request, a second response from the second service comprising the second data, wherein the client computing device associates the data associated with the resource property with the first service, wherein transmitting the second request and receiving the response to the second request are executed without the client computing device communicating the second service and without the client computing device receiving an indication that the first service communicates with the second service; and
   transmitting, to the client computing device, a response to the first request, the response comprising the second data.

13. The non-transitory physical computer storage of claim 12, wherein the first service is associated with a first database management system and the second service is associated with a second database management system.

14. The non-transitory physical computer storage of claim 12, wherein the service call is a uniform resource identifier query.

15. The non-transitory physical computer storage of claim 12, wherein the reference property comprises a reference property name, a second service identifier, and the service call is a query to the second service.

16. A computer-implemented method comprising:
   under control of a computer system comprising computer hardware,
      storing a schema index in a schema repository, wherein a primary service implements a first schema and a target service implements a second schema, wherein the schema index has an identifier associated with each of the first schema and the second schema;
      receiving a first data request from a client computing device;
      determining, at a primary service, whether the first data request comprises a request for target service data associated with a reference property stored in a primary service schema, wherein the target service data is stored within a data store of a target service that is separate from the primary service, and wherein the reference property is used to access the target service data stored in the data store of the target service, wherein the reference property comprises a service call for accessing the target service data from the target service;
      transmitting a second data request to the target service for the target service data based at least in part on the service call included in the reference property;
      receiving the target service data from the target service in response to the second data request, wherein the client computing device associates the first data with the primary service, wherein transmitting the second data request and the receiving the response to the second data request are executed without the client computing device communicating with the target service and without the client computing device receiving an indication that the primary service communicates with the target service; and
      transmitting, to the client computing device, a response to the first data request, the response comprising the target service data.

17. The computer-implemented method of claim 16, wherein the service call is a uniform resource locator query.

18. The computer-implemented method of claim 16, wherein the reference property comprises a reference property name, a target service identifier, and the service call is a query to the target service.

19. The computer-implemented method of claim 16, wherein the primary service is associated with a first database management system and the target service is associated with a second database management system.

* * * * *